E. A. HEATH.
Cuspadore.

No. 199,541. Patented Jan. 22, 1878.

Witnesses.
E. G. Ward
S. W. Raphael

Inventor,
Eugene A. Heath
By A. L. Thomson
Atty.

UNITED STATES PATENT OFFICE.

EUGENE A. HEATH, OF NEW YORK, N. Y.

IMPROVEMENT IN CUSPADORES.

Specification forming part of Letters Patent No. 199,541, dated January 22, 1878; application filed November 15, 1877.

*To all whom it may concern:*

Be it known that I, EUGENE A. HEATH, of the city, county, and State of New York, have invented certain new and useful Improvements in Cuspadores, of which the following is a specification:

This invention relates to that class of vessels used as spittoons, and technically denominated "cuspadores." It refers to the particular variety thereof which has the base of the bowl weighted, while the upper part is light, for the purpose of making them "self-righting" when accidentally upset.

The invention has for its object the production of a cuspadore whose exterior shape presents substantially the appearance of the ordinary vessel, the base or bowl of which, however, is so formed that it is practically impossible to overturn or upset the vessel by any of the ordinary disturbing causes. In addition to this peculiar and novel feature the lower part of the bowl is made heavy or weighted, for the purpose of causing the vessel to regain its normal position in case its equilibrium is lost, as in the case of the ordinary class of self-righting vessels.

Figure 1:
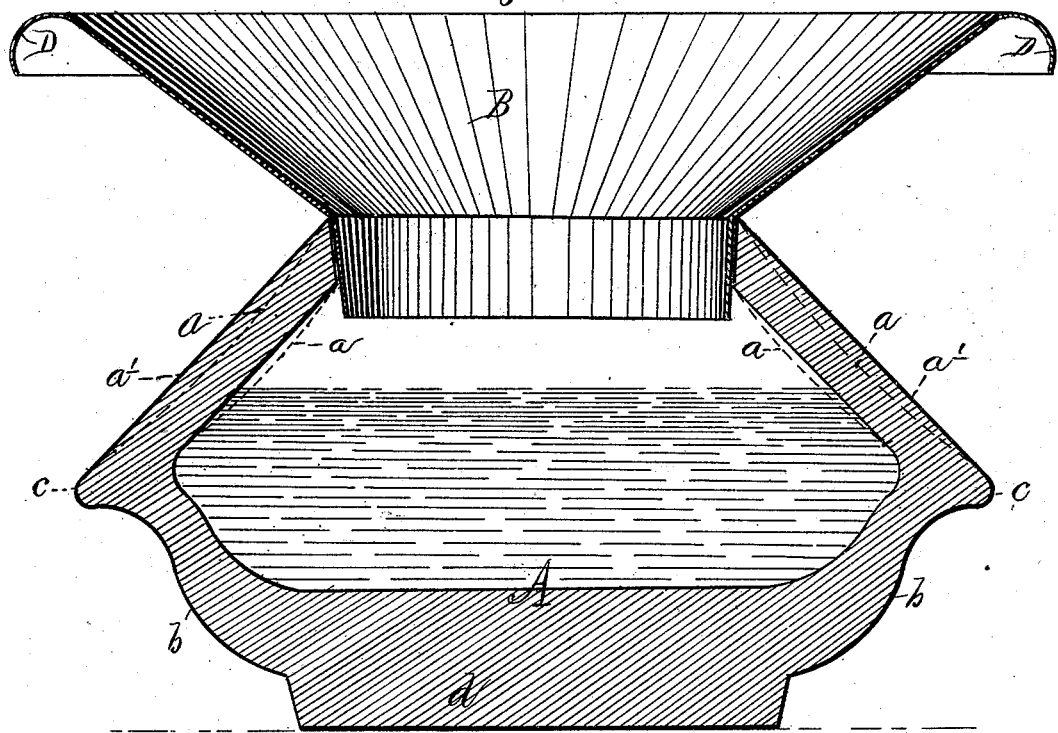
Figure 2:
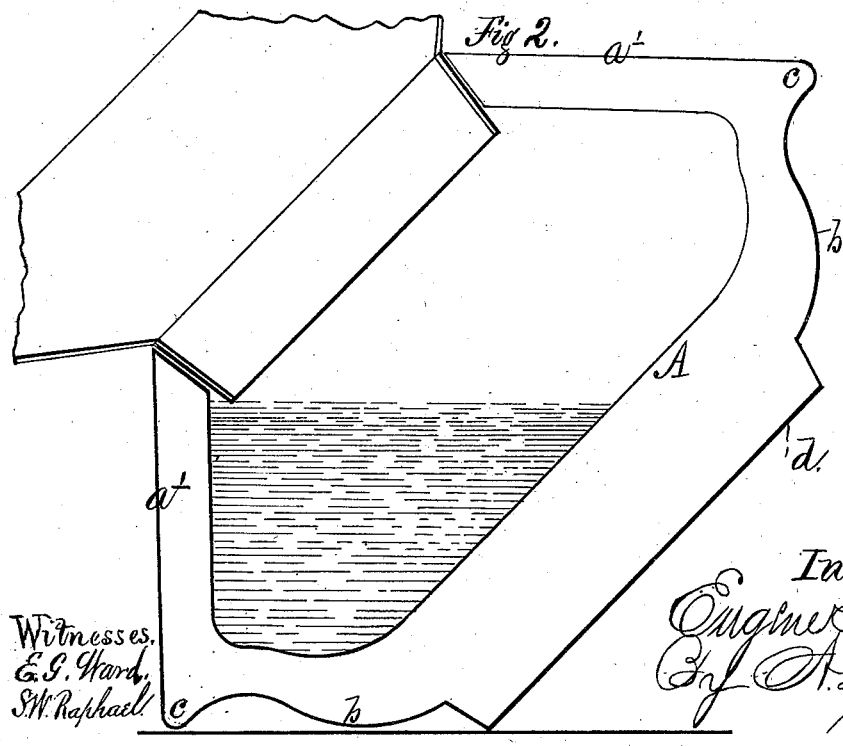

In the drawings, which form an essential part of this specification, Figure 1 represents a sectional elevation of a cuspadore in which my invention is fully embodied; and Fig. 2 is also a sectional view of the same, showing the extreme position to which the vessel can be tipped.

The same letters of reference in both drawings will locate and point out corresponding parts.

Heretofore nearly all devices in cuspadores have tended to the production of self-righting vessels. In the majority of cases the shape of the bowl of the vessel remained the same on the exterior, while various forms of the interior construction and of the shell have been adopted in order to arrive at the one conclusion. All of these vessels, by reason of the configuration of the exterior of the bowl, have embodied the one great defect of being permitted to easily and completely overturn. Much ingenuity has been expended in making such vessels self-righting, without attempting to prevent the overturning of the vessel. It is therefore obvious that a vessel which cannot be readily upset, or but partially so, from any ordinary disturbing cause, and has added thereto the property of also quickly returning to its normal position when its equilibrium is disturbed, is a great desideratum.

The gist of my invention is contained in the peculiar shaping of the exterior of the lower portion or bowl of the cuspadore, the receiving-mouth being of the conventional pattern and style of construction, the object aimed at being to locate and project the cusp of the bowl on the entire circumference thereof, so that the bowl is absolutely prevented from departing from its upright position more than forty-five degrees, or thereabout. Such point being reached, the cusp of the bowl touches the floor, and prevents further movement, and the base of the bowl, below the cusp, being heavy or weighted, the vessel, of course, instantly regains its normal position.

A represents the bowl of the vessel, the configuration of its exterior being practically formed on the line of two irregular curves, $a\, b$, which have their convexities turned in the same direction with respect to the common tangent at the cusp-point $c$, the lower curve $b$ terminating in a flattened base, $d$, upon which the vessel rests when in its normal position, as shown in Fig. 1. The upper curve $a$, as indicated in dotted lines, (see Fig. 1,) terminates in a cone, the apex of which is truncated, and forms an opening, into which the light metallic receiving-mouth is inserted. This upper curve $a$ may be varied in its lines, or formed on a straight line, but in all cases still retaining its relations to the cusp $c$, as shown. The enlargement of the body of the base of the bowl takes place below the termination of the curves $b$; or the base of the vessel may be weighted in any approved manner.

By referring to Fig. 2 it is plainly seen that the vessel may be tipped in any direction from its perpendicular position, and that when it has reached an angle of forty-five degrees, or thereabout, the point of the cusp $c$ will touch the floor, and at once arrest the movement, thus effectually preventing the complete overturning of the vessel. That portion of the vessel formed on the curved line $b$ is, of course, kept retired, so as not to touch the floor at any point.

The receiving-mouth B, formed from light metal, may be attached to the apex of the bowl in any approved manner, according to circumstances, and as the material from which the bowl is constructed may demand.

In order to facilitate the handling of the cuspadore, I have formed the apex of the mouth B in the form of a curved lip, D, which extends the entire circumference thereof, this form of construction permitting the fingers to reach underneath the lip, thereby avoiding any unpleasant contact with the vessel.

Having thus fully described my invention, what I claim as new is—

1. A cuspadore or spittoon the body or bowl of which, in its exterior configuration, is formed on two irregular curves, the cusp of which is so projected that when the vessel is tipped from an upright position it touches the floor on the base-line at right angles to the perpendicular, and arrests the further movement of the vessel, substantially as and for the purposes as herein shown and set forth.

2. A cuspadore or spittoon the body or bowl of which, in its exterior configuration, is formed on curved lines $a$ and $b$, forming cusp $c$ at their tangent, curved line $a$ at its apex being truncated, and curved line $b$ terminating in a flattened base of increased weight, all arranged and operating as and for the purposes substantially as herein shown and set forth.

3. A cuspadore or spittoon the body or bowl of which is, in its exterior configuration, formed on a straight line, $a'$, and a curved line, $b$, which, at their tangent-point, form the cusp $c$; such vessel being truncated at its apex, while its base is flattened and increased in weight below the cusp-line, all substantially as and for the purposes substantially as herein shown and set forth.

EUGENE A. HEATH.

Witnesses:
  A. L. MUNSON,
  S. W. RAPHAEL.